United States Patent [19]

Hucker

[11] Patent Number: 4,625,160
[45] Date of Patent: Nov. 25, 1986

[54] VARIABLE SPEED CONSTANT FREQUENCY GENERATING SYSTEM

[75] Inventor: David J. Hucker, Rockford, Ill.

[73] Assignee: Sundstrand Corporation, Rockford, Ill.

[21] Appl. No.: 682,250

[22] Filed: Dec. 17, 1984

[51] Int. Cl.[4] .......................... H02P 9/30; H02K 7/10; H02K 23/60; H02K 19/10
[52] U.S. Cl. ......................................... 322/32; 310/83; 310/115; 310/118; 310/125; 310/154; 310/197
[58] Field of Search ...................... 322/29, 32; 310/83, 310/114, 115, 118, 124, 125, 154, 197, 266

[56] References Cited

U.S. PATENT DOCUMENTS

| | | | |
|---|---|---|---|
| 1,675,960 | 7/1928 | Schon et al. | 310/114 X |
| 2,137,738 | 11/1938 | Faubion | 310/118 |
| 2,666,174 | 1/1954 | Pestarini | 310/114 X |
| 3,321,650 | 5/1967 | Pedone, Jr. et al. | 310/115 |
| 3,445,699 | 5/1969 | Beaudry et al. | 310/125 |
| 3,958,174 | 5/1976 | Studtmann et al. | 322/28 X |
| 4,035,712 | 7/1977 | Yarrow et al. | 322/32 X |
| 4,041,368 | 8/1977 | Gritter | 322/47 |
| 4,056,746 | 11/1977 | Burtis | 310/115 |
| 4,246,531 | 1/1981 | Jordan | 322/32 X |
| 4,330,743 | 5/1982 | Glennon | 322/10 |
| 4,554,501 | 11/1985 | Baker | 322/29 |

OTHER PUBLICATIONS

Standard Handbook for Electrical Engineers, 11th Edition, pp. 7-2, 7-24, 7-25 and 20-13.

Primary Examiner—William B. Perkey
Attorney, Agent, or Firm—Wood, Dalton, Phillips, Mason & Rowe

[57] ABSTRACT

A variable speed constant frequency generating system for generating constant frequency electrical output power from a variable speed source of motive power includes an exciter for generating excitation current, a main generator for developing the output power, both of the exciter and main generator being driven by a shaft coupled to the motive power source and power converters mounted on the shaft to transfer power between the exciter and the main generator. At shaft speeds below synchronous speed, i.e. that speed which would produce the desired output frequency when DC power is coupled to the main generator field windings, the exciter output is rectified and inverted so that alternating current power of proper frequency is delivered to the field windings of the main generator to maintain the output of the generator at a constant frequency. At synchronous speed, the power converters transfer substantially only DC power to the main generator windings. At speeds above synchronous speed, power is returned back to the exciter to cause same to operate as a motor and apply negative torque to the shaft and thereby maintain the output power at the desired frequency.

19 Claims, 24 Drawing Figures

VARIABLE SPEED CONSTANT FREQUENCY GENERATING SYSTEM

DESCRIPTION

1. Technical Field

The present invention relates generally to generating systems, and more particularly to a generating system which is capable of producing constant frequency alternating current output power from variable speed motive power.

2. Background Art

In prior constant frequency generating systems, such as those utilized in aircraft, a hydromechanical constant speed drive is utilized between the aircraft engine and the generating system so that constant frequency output power is developed by the generating system.

While generating systems utilizing constant speed drives have been succesful in applications requiring low weight, high efficiency and good power quality, the trend in recent years has been toward the use of solid-state components, particularly in view of recent improvements in such components. Systems utilizing solid-state components are of two types, the first referred to as a frequency make-up system and the second known as a full conversion system.

A first prior frequency make-up system utilizes a cycloconverter connected between a wound field exciter and a main generator. The cycloconverter is mounted on a common rotor of the exciter and the main generator, such rotor being driven by an output shaft of a variable-speed prime mover. The cycloconverter controls the frequency of the main generator field current so that the output voltage of the main generator is maintained at a constant magnitude and is of constant frequency.

A second prior frequency make-up system is disclosed in Jordan U.S. Pat. No. 4,246,531. This patent discloses a generating system in which an exciter field winding receives an output signal from a frequency source so that the exciter magnetic field rotates relative to the rotation of a shaft connecting the rotors of a main generator and the exciter to a prime mover. The exciter armature generates an output at a preselected frequency which is coupled to the main generator field winding to establish a magnetic field which rotates directionally relative to the direction of rotation of the shaft to generate an output from the stator of the main generator at a preselected frequency proportional to the frequency source output frequency.

Prior full converter systems include power converters which are connected to convert the full output power of the generator into constant frequency and constant voltage power. Patents disclosing these systems include Studtmann et al U.S. Pat. No. 3.958,174, Gritter U.S. Pat. No. 4,041,368, Yarrow U.S. Pat. No. 4,035,712 and Glennon U.S. Pat. No. 4,330,743.

Frequency make-up systems are advantageous since only a small amount of power is subject to frequency conversion, as opposed to full conversion systems which must convert the entire output power of the generator. A further advantage of the frequency make-up system is that the cycloconverter is bi-directional and hence can transfer power not only from the exciter to the generator but also can return power from the generator to the exciter, thereby allowing constant frequency power to be generated from input speeds above and below synchronous speed. Moreover, the frequency make-up system is simpler than the full conversion system since in the make-up system the maximum make-up frequency, i.e. the frequency difference between the power delivered to the main generator field and the output of the exciter, is generally less than the possible frequency variance of the output of the main generator from the desired frequency in the full conversion system.

Prior make-up systems suffer from various disadvantages. Most importantly, the shaft speed is severely limited due to the high centripetal forces on the components utilized in the cycloconverter. At the resulting relatively low shaft speeds, the magnetic weight of the generating system is too large to allow the system to be useful in certain applications. Furthermore, cycloconverters utilize silicon controlled rectifiers which require relatively complex commutation and/or timing circuits. Also, the silicon-controlled rectifiers used in these systems have been typically limited to a junction temperature of 125° C., which rendered these types of systems unsuitable in high temperature applications.

DISCLOSURE OF THE INVENTION

In accordance with the present invention, a generating system for generating constant frequency power from variable speed motive power utilizes rectifiers and inverters mounted on a rotor of the generating system which are controlled to convert and transfer power between an exciter and a main generator so that the generator develops constant frequency alternating current power.

A first rectifier rectifies the variable frequency power from the exciter and supplies this rectified power to a field inverter. At speeds below "synchronous speed" (i.e. the speed at which the desired frequency is produced at the output of the generator when DC power is supplied to a field winding thereof), the field inverter is controlled by a voltage/frequency control circuit to supply field power to the field winding of the main generator at a frequency which maintains the output power of the generator at the desired frequency. At speeds above synchronous speed, a second rectifier rectifies the power from the field inverter and supplies this rectified power to a motor inverter to operate the exciter as a motor and thereby return power to the exciter rotor. During this time, the field inverter is controlled so that voltage control at the main generator output is assured.

By replacing the cycloconverter of prior systems with rectifiers and inverters, power transistors may be utilized which can operate at higher junction temperatures and which can be arranged to withstand higher rotor "g" forces.

The system may utilize either a wound field exciter or a permanent magnet exciter in which permanent magnets are disposed in a housing of the exciter. The housing may be stationary or may counter-rotate relative to the rotor to thereby increase the airgap speed of the exciter. By increasing the airgap speed, the exciter magnetic weight can be reduced for a given output voltage and hence the overall size of the generating system can be held to a minimum.

The system may also utilize a free-running damper cage which is disposed in the airgap of the output alternator and which rotates at nearly synchronous speed. The damper cage renders voltage transients uniform over the speed range of the prime mover and maintains the transient magnitudes similar to those of a synchronous machine. Furthermore, the damper cage filters out slot ripple effects between the rotor and stator of the alternator and minimizes ripple currents in the rotating inverter semiconductors.

BEST MODE FOR CARRYING OUT THE INVENTION

Figure 1:
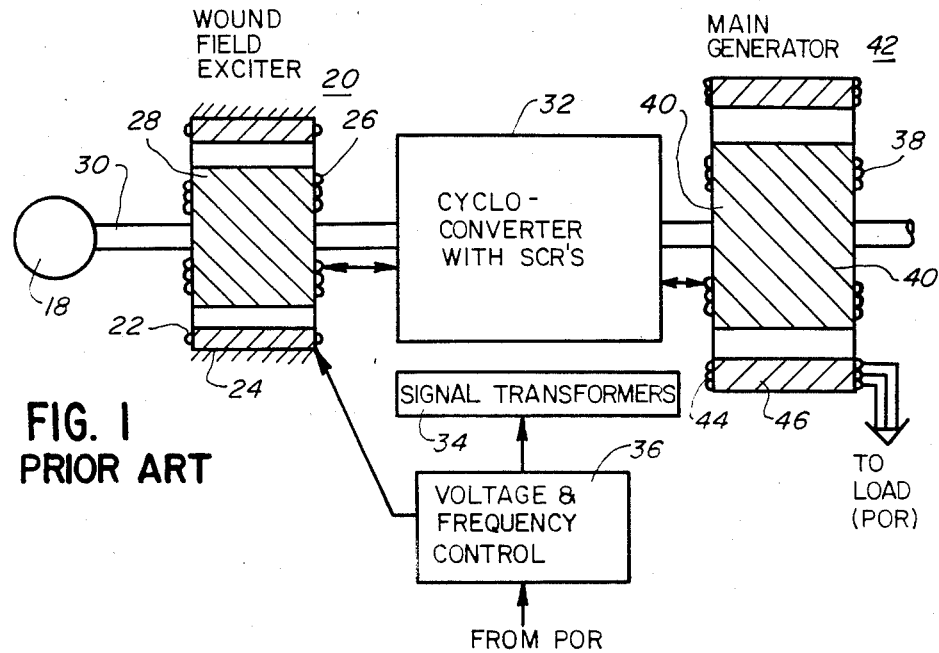
FIG. 1 is a block diagram of a prior art frequency make-up system.

Referring now to FIG. 1, there is illustrated a prior art generating system which develops constant frequency alternating current power from motive power developed by a variable speed prime mover 18. The system includes a wound field exciter 20 having a stationary field winding 22 disposed in a stator 24 and a plurality of armature windings 26 disposed in a rotor 28 driven by a shaft 30 of the prime mover 18. The exciter output from the armature windings 26 has a frequency dependent upon the speed of the shaft 30. The frequency of the exciter power is converted by a shaft mounted cycloconverter 32 which comprises a series of silicon-controlled rectifiers along with associated firing and commutation circuits. Firing signals for the SCR's are provided through signal transformers 34, which in turn receive the firing signals from a voltage and frequency control circuit 36. The voltage and frequency control circuit 36 senses the voltage at a point of regulation, or POR (typically at a point near the load), and adjusts the exciter field current and the timing of the firing signals of the SCR's in the cycloconverter 32 to control the power developed thereby. This power is delivered to a set of field windings 38 disposed in a rotor 40 of a main generator or alternator 42. The rotor 40 of the main generator 42 is driven by the shaft 30 at the same speed as the rotor of the exciter.

The frequency of the field power delivered to the main generator field windings 38 is controlled to set up a rotating field in the space occupied by a plurality of armature windings 44 disposed in a stator 46 of the main generator 42. The speed of this rotating field is controlled with regard to the number of poles of the main generator so that the frequency of the output power from the main generator armature windings is maintained at a constant value within a particular range of shaft speeds.

As previously noted, this system suffers from various disadvantages which limit its usefulness to relatively few applications. The most serious disadvantage is the inability of the system to operate at high speeds, in turn increasing the weight necessary to supply a particular output.

Figure 2:
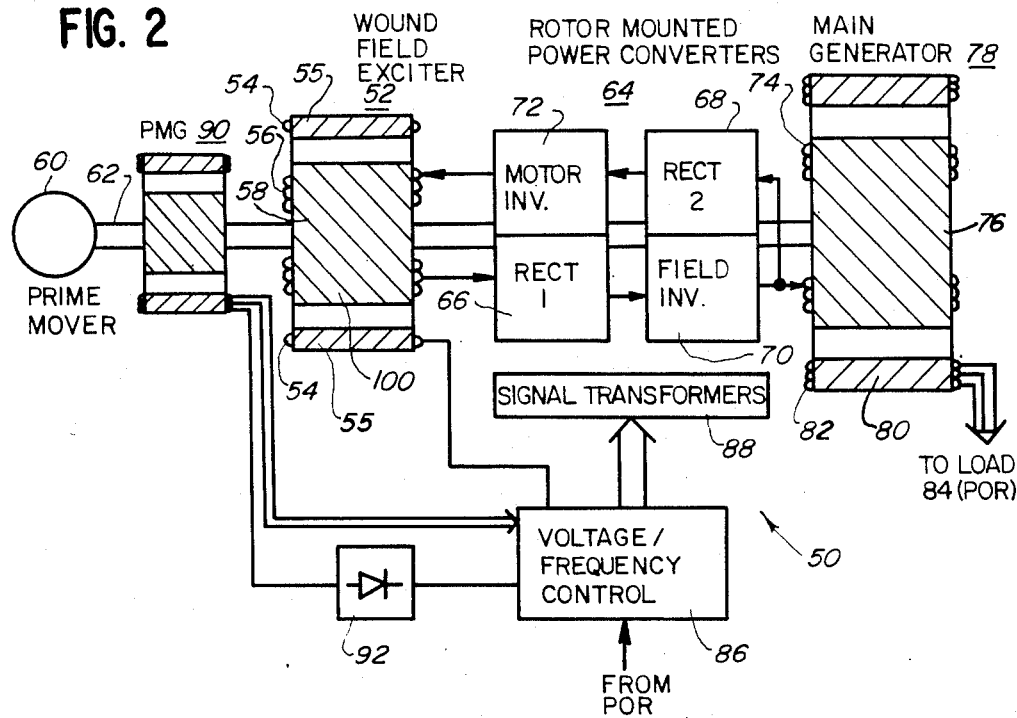
FIG. 2 is a generalized block diagram of a first embodiment of a frequency make-up system according to the present invention.

Referring now to FIG. 2, there is shown a variable speed constant frequency, or VSCF, generating system according to the present invention which does not utilize a cycloconverter or SCR's, and hence avoids the disadvantages of the prior art.

The VSCF system 50 shown in FIG. 2 includes a wound field exciter 52 having field windings 54 disposed in a stator 55 and a set of armature windings 56 disposed in a rotor 58 driven by a source of motive power such as prime mover 60, through a shaft 62.

The exciter output power from the armature windings 56 is coupled to a series of rotor-mounted power converters 64 comprising first and second rectifiers 66,68, a field inverter 70 and a motor inverter 72.

The power converters 64 transfer power between the exciter 52 and a set of field windings 74 disposed in a rotor 76 of a main generator or an alternator 78. A stator 80 of the main generator 78 contains armature windings 82 which develop output power which is, in turn, delivered to a load 84.

The frequency of the output power from the armature windings 82 and the harmonic content thereof is controlled by the gating of switches in the field inverter 70. This gating is accomplished by a voltage/frequency control 86 which senses the output voltage at a point of regulation, or POR, near the load and develops switch control signals. The control signals are coupled through a series of rotating signal transformers 88 to the switches in the field and motor inverters 70,72. The voltage/frequency control 86 also accomplishes output voltage regulation in the exciter 52 by controlling the field current thereto. The control 86 receives power from a permanent magnet generator, or PMG 90, and a rectifier circuit 92. The PMG output is also utilized by the control 86 to control the timing of the signals coupled to the rotating transformers 88, as noted more specifically below.

Figure 3:
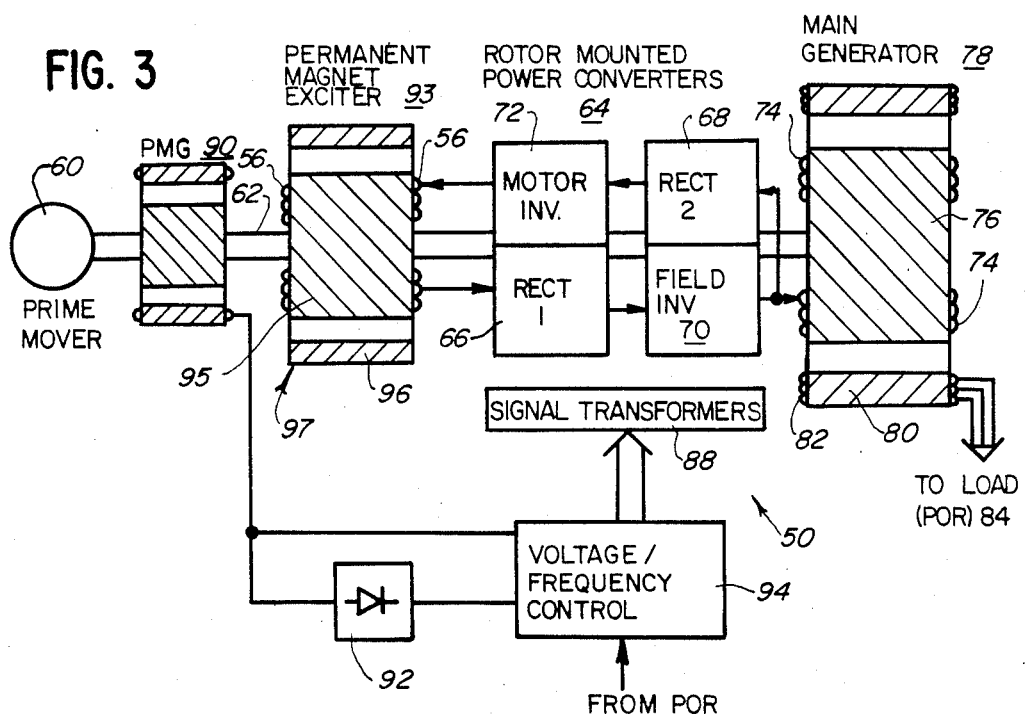
FIG. 3 is a generalized block diagram of a second embodiment of a frequency make-up system according to the present invention.

Referring now to FIG. 3, there is illustrated a further embodiment of the invention wherein reference numerals common to FIGS. 2 and 3 denote like structures.

The generating system of FIG. 3 is essentially identical to that shown in FIG. 2 with the exception that a permanent magnet exciter 93 is utilized in the embodiment of FIG. 3 in place of the wound field exciter 52 shown in FIG. 2. In this embodiment, voltage regulation is accomplished by a voltage/frequency control 94 which controls the rotor mounted power converters 64 rather than controlling the exciter field.

The permanent magnet exciter 93 includes a set of armature windings 56 disposed within a rotor 95. The exciter 93 also includes a permanent magnet field structure 96 which sets up a magnetic field in the space occupied by the rotor 95. The permanent magnet field structure 96 is disposed within a housing 97 which may be stationary or which may be rotated in a direction opposite to the direction of rotation of the shaft 62 to increase the speed of the rotor 95 relative to the structure 96. This increase in relative speed (hereinafter termed "airgap speed") allows the size and weight of the magnetics in the exciter to be reduced for a particular output.

Figure 5:
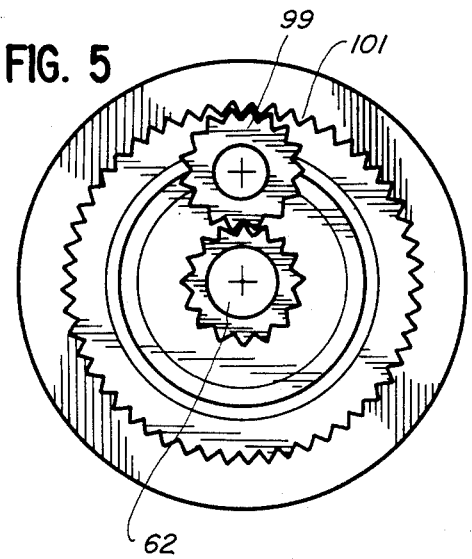
FIG. 5 is a sectional view taken along the lines 5—5 of FIG. 4.
Figure 4:
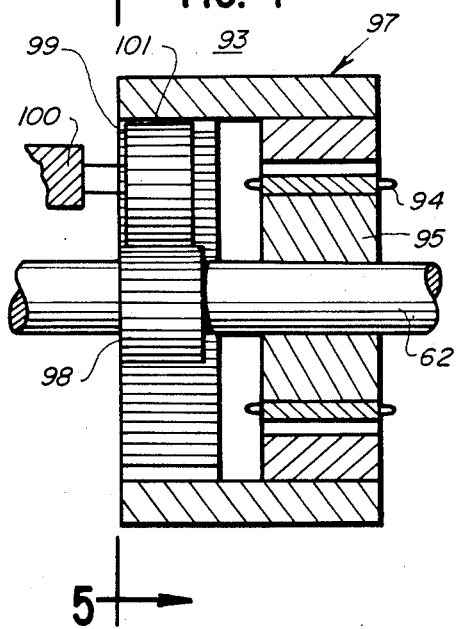
FIG. 4 is an elevational view, partly in section, of the permanent magnet exciter shown in block diagram form in FIG. 2.

Referring now to FIGS. 4 and 5, in the event that the exciter 93 has a counter-rotating field structure, a sprocket 98 is fixed to the shaft 62 and engages a spur gear 99 which is rotatably mounted on a fixed spindle 100. The spur gear 99 in turn engages the teeth of a ring gear 101 fixed to the housing 97.

In the preferred embodiment, the diameter and number of teeth of the sprocket 98, the spur gear 99 and the ring gear 101 are selected so that the magnet structure 96 rotates at an absolute speed equal to the speed of the shaft 62 divided by 2.5. The airgap speed between the magnetic structure 96 and the armature windings 94 is therefore equal to 1.4 times the absolute speed of the shaft 62.

A particularly suitable exciter rotor structure for the instant system is that disclosed in Hucker et al, Ser. No. 565,345, filed Dec. 27, 1983, entitled "Rotor Magnetic Structure" and assigned to the assignee of the instant application. It should be noted that either exciter 52 or 93 referred to herein may utilize the rotor structure disclosed in such application. An exciter utilizing such a rotor structure saturates at low load levels and hence the switches in the power converters 64 connected to the output of such rotor need not be capable of tolerating wide extremes in output voltage as a function of load. Accordingly, switching stresses can be reduced and/or less expensive power transistors could be utilized in the power converters 64 if an exciter utilizing such a rotor structure is utilized.

In each of the embodiments shown in FIGS. 2 and 3, the rotor-mounted power converters are controlled as a function of shaft speed. In general, the field inverter 70 is controlled at shaft speeds below synchronous speed, i.e. that speed which produces the desired frequency output when DC power is delivered to the field windings of the main generator, to deliver alternating current power of the proper make-up frequency to the main generator field windings 74 so that the frequency of the output power is maintained at a desired value. In general, the frequency of the power from the field inverter 70 is controlled to be equal to the desired frequency minus the frequency that would be produced if DC power were supplied to the field windings of the main generator 78.

When the shaft speed is at synchronous speed, the field inverter is controlled so that DC power is supplied to the main generator rotor to in turn maintain the output power at the desired frequency. At synchronous speed the system requires only enough DC excitation to overcome the DC resistance of the main generator field windings.

At speeds above synchronous speed, the field inverter 70 is controlled to reverse the phase sequence of power delivered to the main generator field winding. The field inverter 70, in effect, supplies negative frequency makeup power to control the frequency of the output power. Also, during this time the motor inverter 72 is controlled so that power is returned from the field inverter 70 through the second rectifier 68 to the exciter 52 or 93 to operate same as a motor. The exciter 52 or 93 is operated as a motor to apply negative torque to the shaft 62 and hence maintain torque balance within the system. In effect, the excess power caused by the overspeed condition is returned back to the exciter to prevent such power from causing a change in frequency at the output of the generator 78.

Figure 6:
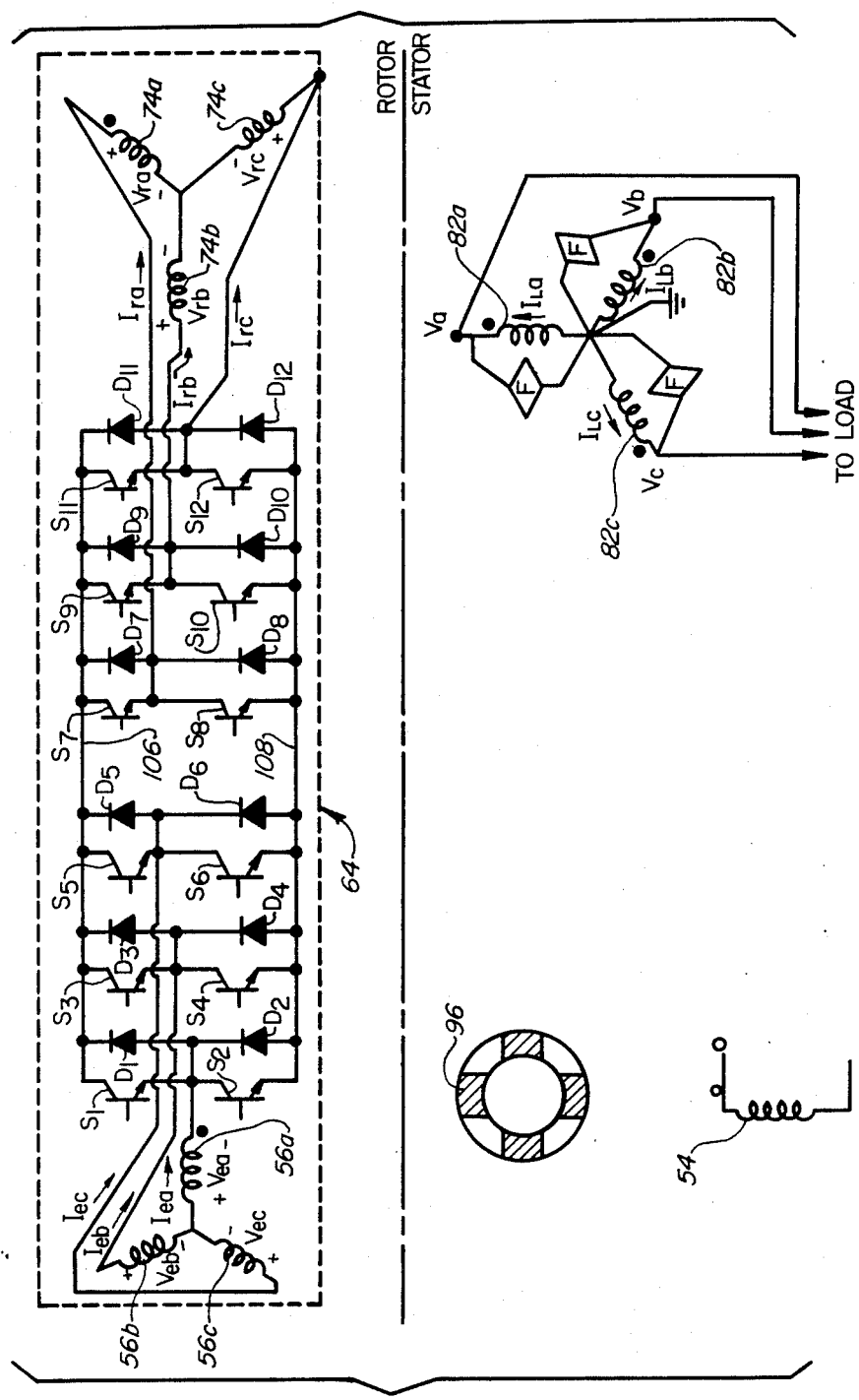
FIG. 6 is a simplified schematic diagram of the inverters and rectifiers shown in block diagram form in FIGS. 2 and 3.

Referring now to FIG. 6, there is shown a simplified schematic diagram of the armature windings of the exciter 52 or 93, the rotor mounted power converters 64 and the main generator field windings 74.

Disposed within the exciter rotors 58 or 95 are three sets of armature windings $56a$–$56c$ which develop output voltages $V_{ea}$, $V_{eb}$ and $V_{ec}$ and output currents $I_{ea}$, $I_{eb}$ and $I_{ec}$. The output of the exciter armature windings 56 is connected to the first rectifier 66 comprising diodes D1–D6 connected in inverse parallel relationship with power transistors S1–S6, which together comprise the motor inverter 72. The first rectifier 66 and the motor inverter 72 are connected by a pair of power buses 106, 108 to the field inverter 70 and the second rectifier 68.

The second rectifier 68 comprises six diodes D7–D12 connected in inverse parallel relationship with six power transistors S7–S12, which together comprise the field inverter 70.

The main alternator field windings 74, comprised of windings $74a$, $74b$, $74c$, are connected to the second rectifier 68 and to the field inverter 70. The currents through the windings 74, designated $I_{ra}$, $I_{rb}$ and $I_{rc}$ and the voltages across each winding 74, designated $V_{ra}$, $V_{rb}$ and $V_{rc}$, are controlled by the power converters 64 to set up a rotating magnetic field in space occupied by main generator armature windings $82a$–$82c$. As previously noted, the armature windings $82a$–$82c$ develop constant frequency power represented by load currents $I_{La}$, $I_{Lb}$, $I_{Lc}$ and load voltages $V_a$, $V_b$, $V_c$.

Figure 7:
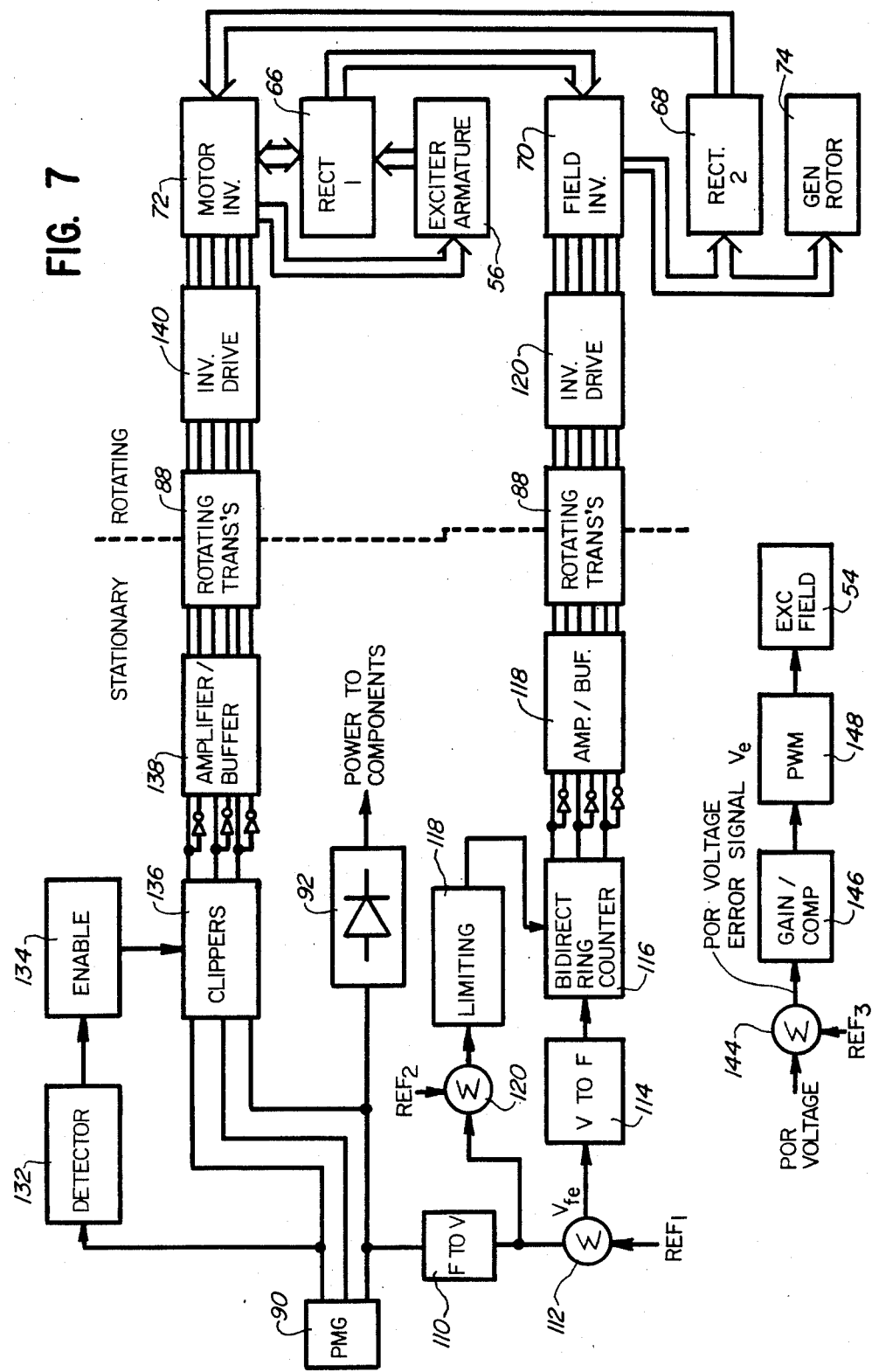
FIG. 7 is a block diagram of the voltage/frequency control shown in FIG. 5.

Referring now to FIG. 7, there is illustrated a first embodiment of the voltage/frequency control illustrated as block 86 in FIG. 2 in conjunction with a generalized block diagram of the remainder of the generating system. Power for the components of the control 86 is derived, as previously noted, from the PMG 90 and rectifier 92.

The PMG 90 is a small signal level device having the same number of poles and phases as the exciter 52. One phase of the output from the PMG 90 is coupled to a frequency-to-voltage converter 110 which develops a voltage level proportional to the frequency of the output from the PMG 90. This voltage level is coupled to a summer 112 which compares this voltage level against a first reference, designated REF$_1$, to derive a frequency error signal $V_{fe}$. The output from the summing junction 112 is coupled to a voltage-to-frequency converter circuit 114 which converts the frequency error voltage into an alternating current signal having a frequency proportional to the voltage from the summing junction 112. This alternating current signal is coupled to a first input of a bi-directional ring counter 116. The counter 116 also includes a second input which receives a limited error signal from a summing junction 120. The junction 120 compares the output of the frequency-to-voltage converter 110 with a second reference, designated REF$_2$.

The siganl from the voltage-to-frequency converter 114 determines the frequency of three signals developed at the output of the counter 116. The phase sequence of the signals from the counter 116 is determined by the voltage from the summing junction 120 and the limiting circuit 118. In general, if the signal from the limiting circuit 118 indicates that shaft speed is below synchronous speed, then the ring counter develops a set of three switching signals which control the switches in the field inverter 70 in a normal sequence, i.e. phase A, phase B and phase C, sequentially, to transfer power to the main generator field windings 74. Alternatively, if the signal from the limiting circuit 118 indicates that shaft speed is above synchronous speed, then the ring counter 116 develops switching signals in a reverse phase sequence, i.e. phase A, phase C, phase B, sequentially, to transfer power from the main generator field winding 74 to the exciter armature windings 56 through the second rectifier 68 and the motor inverter 72, seen in FIG. 2.

Each of the three outputs from the ring counter 116 is coupled to an amplifier/buffer circuit 118 along with three switching signals which are derived by inverting the outputs of the ring counter 116. The six resulting switch control signals are processed by the amplifier/buffer circuit 118 and are connected through the rotating signal transformer 88 to an inverter drive circuit 120. The drive circuit 120 develops suitable base drive signals for the power transistors in the field inverter 70.

The remainder of the circuitry shown in FIG. 7. is utilized to control the return of power from the main generator 78 to the exciter 52. One phase of the power from the PMG 90 is connected to a detector 132 and an enable circuit 134 which develop an enabling signal for controlling a clipper circuit 136 as a function of shaft speed. When the speed of the shaft 62 is less than synchronous speed, the detector 132 and the enable circuit 134 totally disable the clipper circuit 136 so that the motor inverter 72 is disabled. However, when the shaft speed is above synchronous, the clippers 136 are enabled and clip the majority of the three phase output from the PMG 90, in turn developing a set of three square waves at the PMG and exciter frequency. These square waves, along with inverted versions thereof, are connected through an amplifier/buffer circuit 138 and the rotating transformers 88 to an inverter drive circuit 140. The drive circuit 140 develops suitable base drive signals for the power transistors in the motor inverter 72.

Output voltage regulation is accomplished by means of a summing junction 144, which compares the POR voltage with a desired voltage to develop of POR voltage error signal $V_e$. This signal is connected through a gain and compensation circuit 146 to a PWM control circuit 148. The PWM control circuit 148 pulse-width modulates the power developed by the PMG 90 in accordance with the compensated error voltage from the circuit 146 and delivers this power to the exciter field 54.

Figure 8:
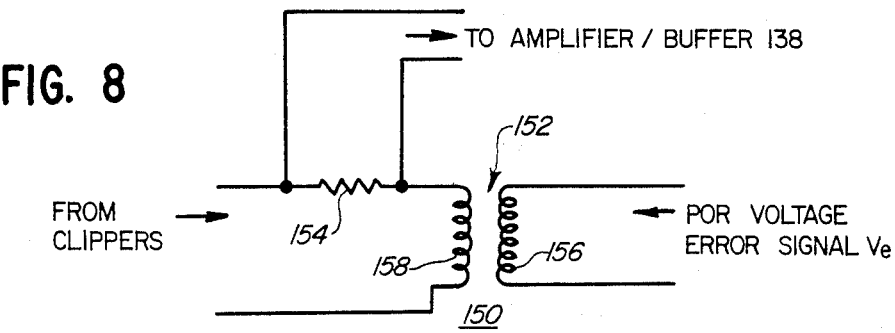
FIG. 8 is a schematic diagram of a modification to the control of FIG. 7 to allow the control to be utilized in conjunction with the system shown in FIG. 3.

Referring now to FIG. 8 there is shown a modification of the circuitry 84 shown in FIG. 7 to enable this circuitry to be utilized in a generating system having the permanent magnet exciter 93. In this case, the detector 32 and the enable circuit 134 are not utilized and each of the three outputs from the clippers 136 is continuously active and connected to a phase shifting network 150. Each network 150 includes a saturable core transformer 152 and a load resistor 154. The transformer 152 includes a control winding 156, which is connected to the POR voltage error signal $V_e$ shown in FIG. 7, and a secondary windings 158. It should be noted that in the case of a system utilizing a permanent magnet exciter, the gain and compensation circuit 146, the PWM control circuit 148 and the exciter field windings 54 shown in FIG. 7 are not present.

Figure 9:
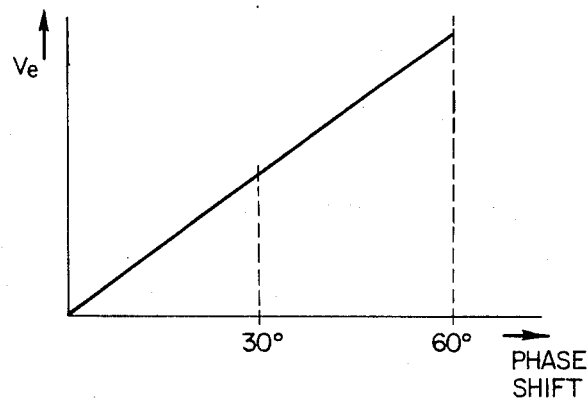
FIG. 9 is a graph illustrating phase shift as a function of the magnitude of the error signal $V_e$ shown in FIG. 8.

As illustrated in the graph of FIG. 9, the voltage error signal $V_e$ controls the reactance of a circuit formed by the load resistor 154 and the winding 158 to thereby vary the phase of an output signal developed across the load resistor 154. This phase shift starts at 0° for $V_e=0$ and reaches a maximum shift of 60° at a predetermined value of $V_e$.

Figure 10:
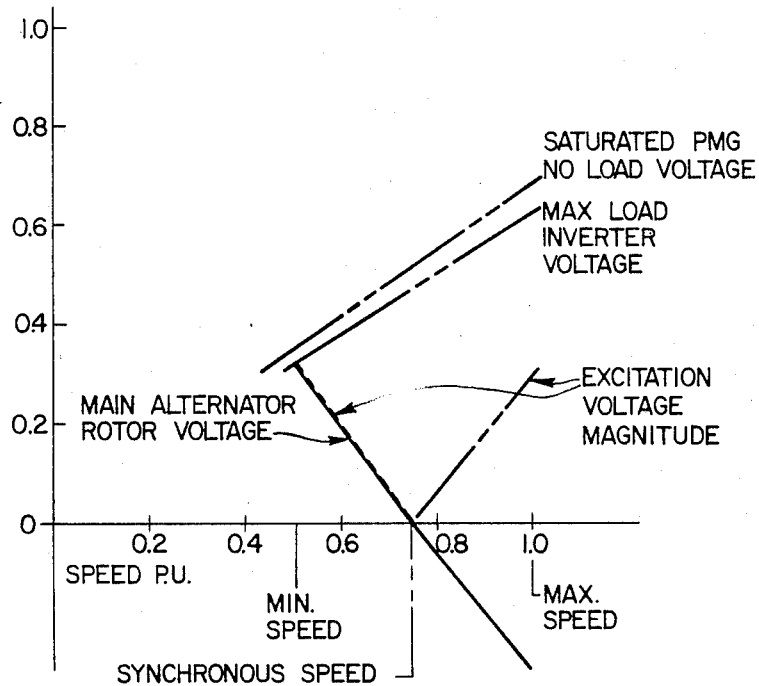
FIG. 10 is a graph of the system parameters as a function of speed for the embodiments shown in FIGS. 2 and 3.

Referring now to FIG. 10, there is shown a graph illustrating system parameters as a function of speed for a generating system subjected to a 2:1 speed ratio. In this graph, synchronous speed is designated as 0.75 per unit (or pu) while minimum speed is designated 0.5 pu and maximum speed is designated 1.0 pu. It can be seen that the main alternator AC field voltage required to maintain output voltage at the appropriate frequency and level decreases approximately linearly from minimum speed to maximum speed. The negative excursion of the graph at synchronous speed and above designates power flow in a reverse direction from the main generator to the exciter.

The required excitation voltage magnitude is symmetric about the synchronous speed point. The exciter, whether the permanent magnet type 52 or the wound field type 93, must be capable of supporting the required voltage at minimum speed and maximum load.

As previously noted, the wound field exciter 52 is controlled by the voltage/frequency control 86 so that the required excitation voltage magnitude is supplied by the exciter 52.

Figure 11A:
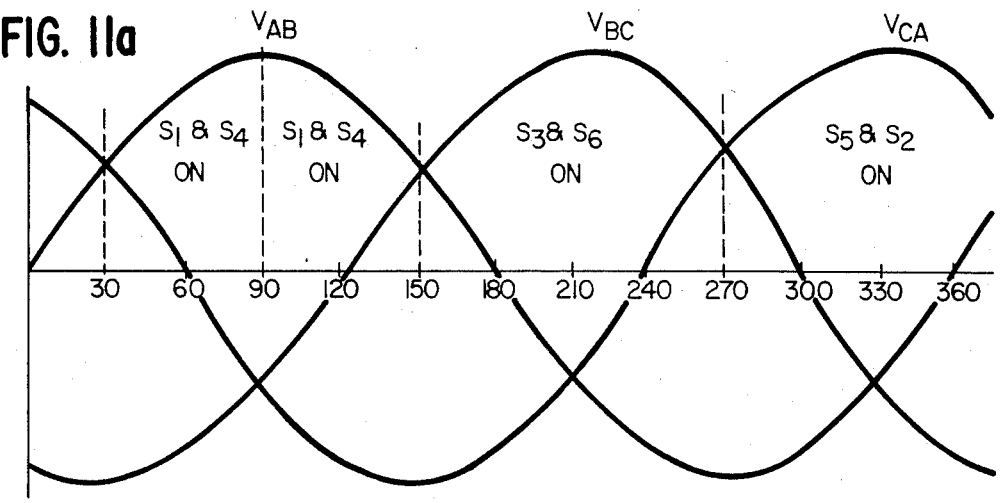
FIGS. 11a–11c are waveform diagrams illustrating the operation of the circuitry shown in FIGS. 2, 6 and 8.

In the case of the permanent magnet exciter 93, the required excitation voltage is obtained by the phase shift imparted to the signals from the clipper circuit 136 by the transformer 150 shown in FIG. 8. Referring specifically to FIG. 11a, at minimum speed equal to 0.5 pu, the switches S1–S6 in the motor inverter 72 are gated on at appropriate intervals to cause conduction of the rectifiers D1–D6 to in turn control the level of the DC voltage on the power buses 106,108. As previously mentioned, the magnitude of the AC voltage required at the minimum speed point is high, and hence the diodes must conduct over a relatively long duration for each phase waveform. For example, referring specifically to the voltage waveform $V_{AB}$ which is the phase-to-phase voltage between phases A and B, i.e. $V_{ea} - V_{eb}$, the switches S1 and S4 are maintained in an on state for 60° on either side of the 90° point in the waveform. Similarly, switches S3 and S6 are maintained in the on condition for 60° on either side of the 210° point, at which time the voltage $V_{BC}$ representing the phase-to-phase voltage difference between phases B and C is at a maximum. Likewise, switches S2 and S5 are maintained in an on state for 60° on either side of the 330° point, i.e. the point at which the phase-to-phase voltage $V_{CA}$ between phases C and A is at a maximum.

Figure 11B:
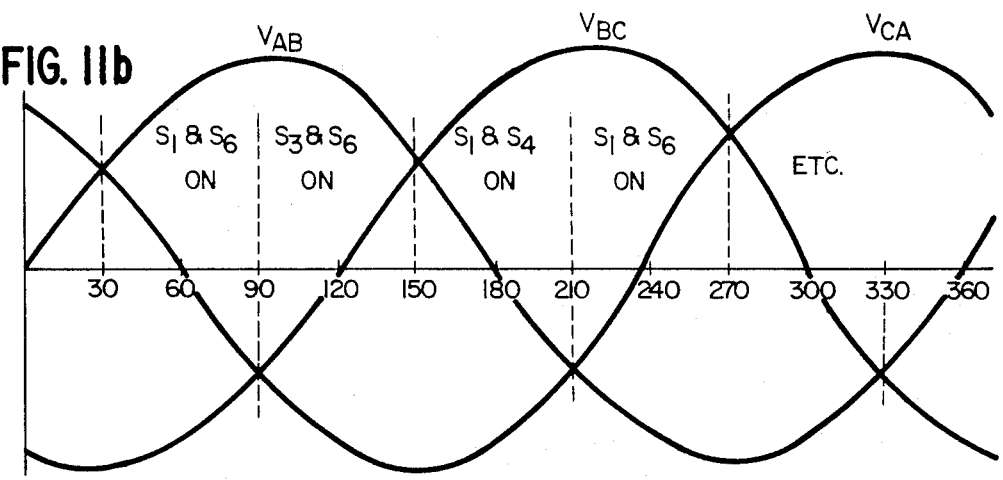

Referring also to FIG. 11b, as the speed of the shaft increases to synchronous speed, the required AC excitation voltage magnitude drops to a point close to zero. The switches S1–S6 are therefore controlled to maintain this required voltage. Two of the switches in the motor inverter 72 are turned on during a 60° "window" centered on the zero crossing of one of the phase-to-phase voltages. For example, the switches S1 and S6 are maintained in an on state between 30° and 90°, during which time the phase-to-phase voltage $V_{CA}$ passes through zero. Similarly, the switches S3 and S6 are turned on between 90° and 150°, with the phase-to-phase voltage $V_{BC}$ passing through zero at 120°. Likewise, the switches S1 and S4 are turned on for 30° on either side of the zero crossing point of the phase-to-phase voltage $V_{AB}$ at 180°. This switching sequence continues until there is a change in the shaft speed.

Figure 11C:
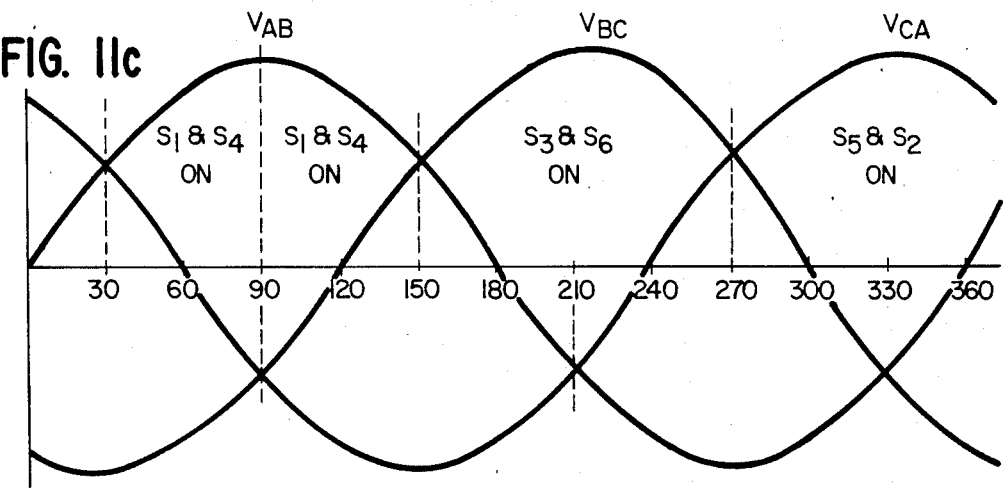

Referring to FIG. 11c, when the shaft speed is at maximum rated speed, the switches S1–S6 are controlled in an identical fashion as was noted with respect to the switch operation at the low speed point, the only difference being that current flow is in an opposite direction relative thereto. In other words, the switches S1 and S4 are maintained in an on condition between 30° and 150°, during which time they conduct current back to the exciter armature windings 56. Likewise, the switches S3 and S6 are maintained in an on condition between 150° and 270° while the switches S2 and S5 are maintained in an on condition from 270° to 390°.

At speeds above synchronous, the switches in the motor inverter 72 are operated to inject current into the exciter when the back EMF developed thereby is greater than the voltage across the main generator field windings.

Figure 12A:
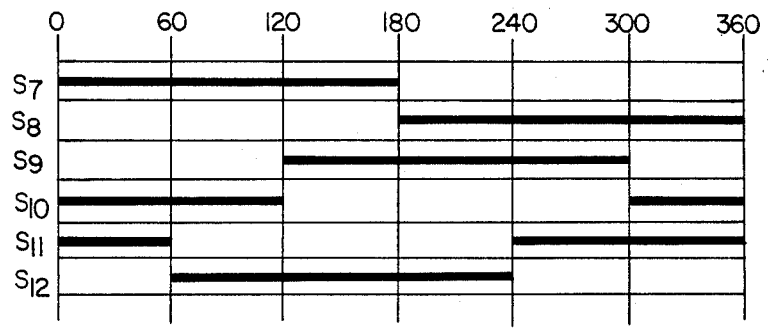
FIGS. 12a–12d together comprise a series of graphs ilustrating the operation of the rectifiers and inverters shown in FIG. 6 for a speed condition below synchronous speed.
Figure 12B:
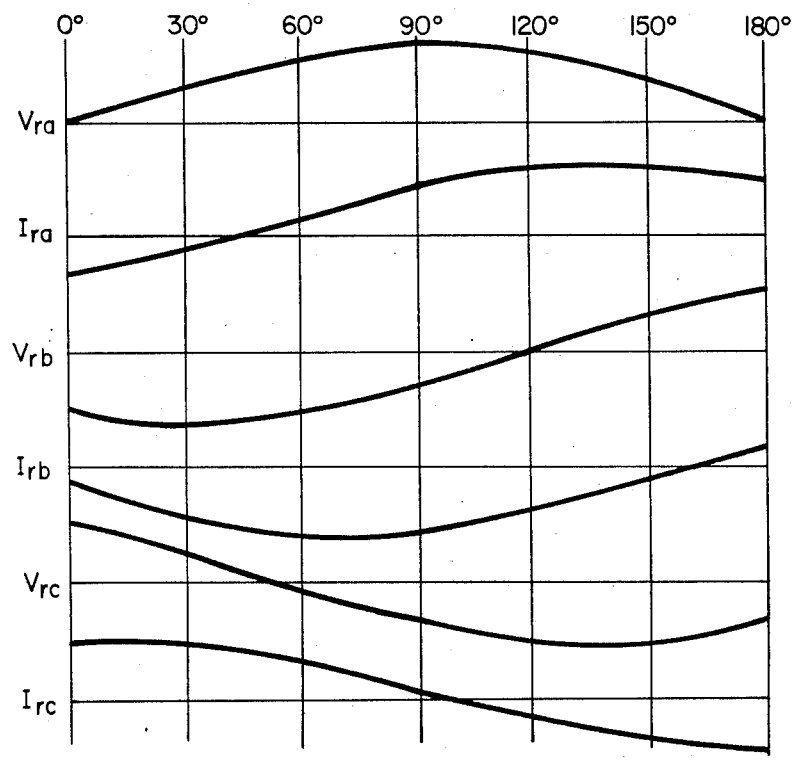
Figure 12C:
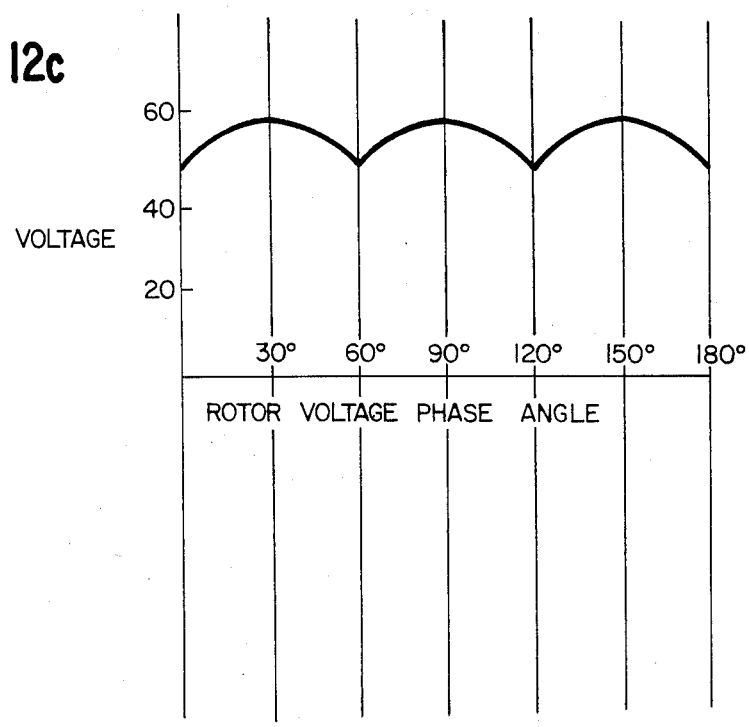

Referring now to FIGS. 12a–12c, there is illustrated a set of waveform diagrams illustrating the operation of the switches in the field inverter 70 at speeds below synchronous speed. At speeds below synchronous, the limiting circuit 118 develops a signal which causes the bi-directional ring counter 116 to operate the transistors S7–S12 in the manner shown in FIG. 12a, i.e. the normal or phase A, phase B, phase C sequence. Also, the first rectifier 66 consisting of diodes D1–D6 rectifies the exciter armature voltage to supply DC power to the field inverter 70. If the permanent magnet exciter is used, such as that shown in FIG. 3, the DC voltage from the first rectifier 66 is proportional to the shaft speed (or to the airgap speed of the counter-rotating permanent magnet exciter) and the power electronics in the converters 64 are selected to utilize the available output at the worse overload condition on the system.

FIG. 12b shows the fundamental waveforms resulting from the switching sequence shown in FIG. 12a. The waveforms disclosed are for a load at approximately twice rated load current, 0.75 power factor and a main generator transformer ratio of 1:1.

As seen in FIG. 12c, the average voltage across the power buses 106,108 varies between approximately 50 and 60 volts for a 60 kva system at a generator output voltage of 125 volts rms.

It should be noted that the voltage across the switches in the power converters 64 can be controlled independently of the output voltage by selecting an appropriate generator turns ratio to take advantage o64 can be controlled independently of the output voltage by selecting an appropriate generator turns ratio to take advantage of recent improvements in transistor voltage capabilities. In other words, current in this portion of the system can be maintained at a sufficiently low level to reduce the number of transistors needed in the power converters 64 while at the same time maintaining the power capacity of the system.

Figure 12D:
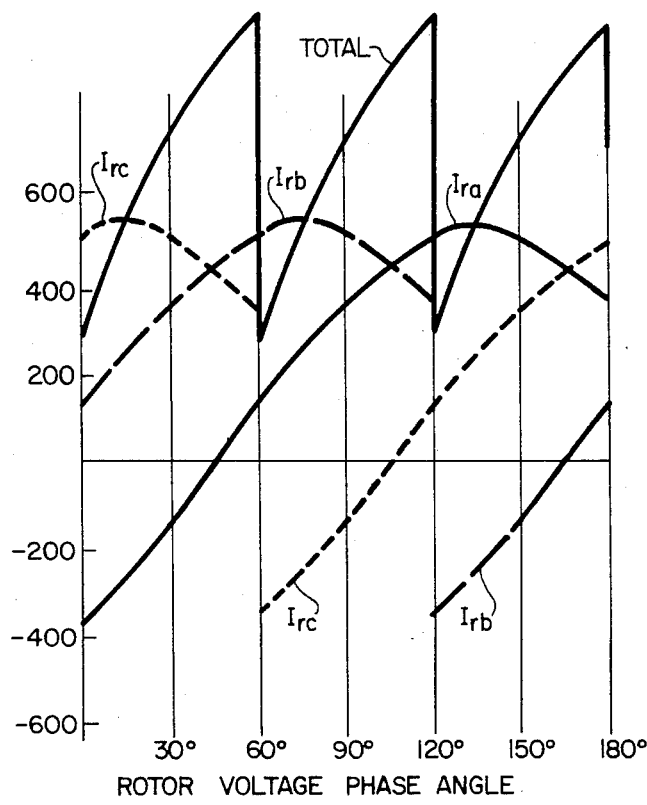

FIG. 12d illustrates the individual phase currents in each of the main generator field windings 74 and the total DC current in the power buses 106,108 for the switching sequence show in FIG. 12a. (Note to Dave Hucker: are these the exciter armature phase currents instead?)

At shaft speeds equal to synchronous speed, the motor inverter 70 and field inverter 72 are controlled so that DC power is provided to either two or three of the alternator field windings 74a–74c. In other words, switches S1–S6 are controlled as previously noted while either two or three of the power transistors S7–S12 are on at any particular time to maintain DC power to the windings 74. During this time, diodes D7–D12 free-wheel to handle reactive currents. Diodes D1–D6 meanwhile carry the main excitation current to the switches S7–S12.

Figure 13A:
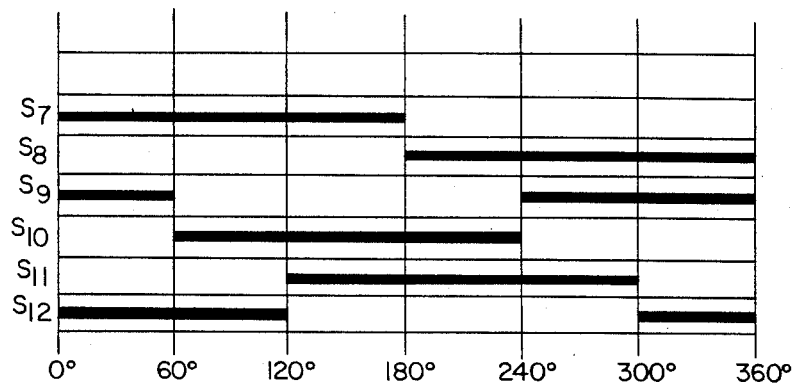
FIGS. 13a–13d together comprise a series of waveform diagrams illustrating the operation of the rectifiers and inverters shown in FIG. 6 for a speed condition above synchronous speed.
Figure 13B:
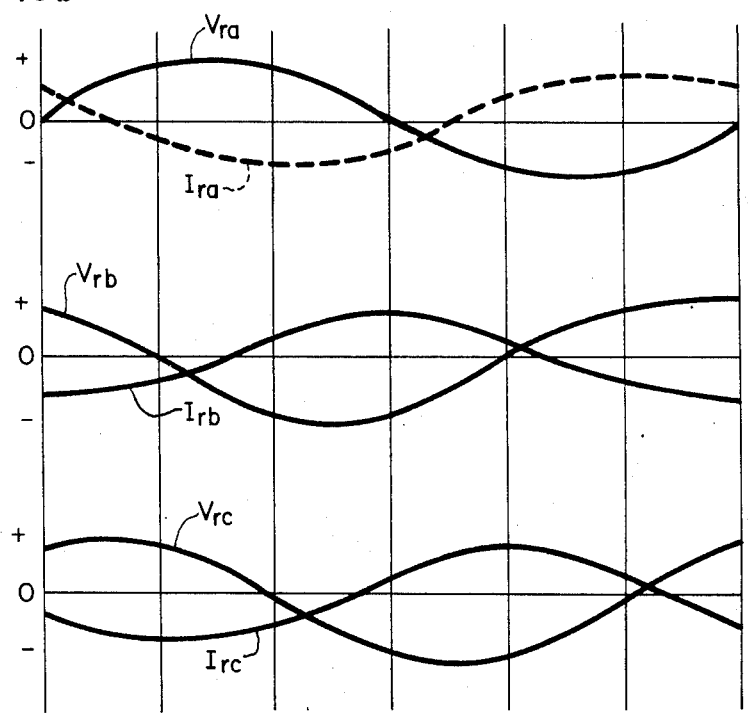

Referring now to FIGS. 13a–13d, at speeds above synchronous, for example at 1.0 pu, the transistors S7–S12 are controlled by the ring counter 16 in the reverse phase sequence. This reversal of phase sequence reverses the field flux in the main alternator to maintain output power at a constant frequency. Furthermore, as shown in FIG. 13b, the power flow between the exciter and main generator is reversed from the low speed case. At this time, the field inverter 70 appears as a generator with high internal impedance.

Figure 13C:
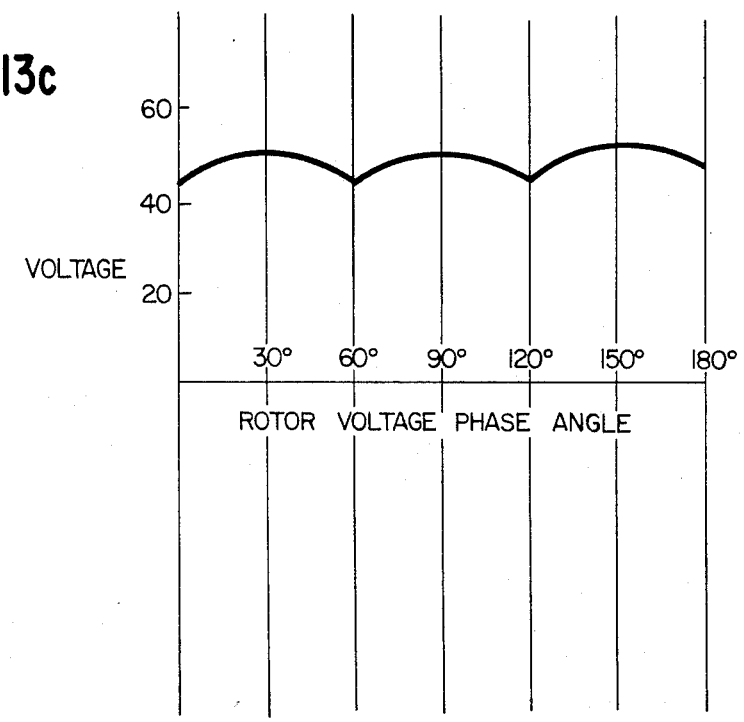

FIG. 13c illustrates the instantaneous DC voltage across the power buses 106,108. This voltage varies between approximately 45 and 53 volts. This waveform is for the case of 2 pu load at 0.75 power factor with a generator voltage ratio of 1:1.

Figure 13D:
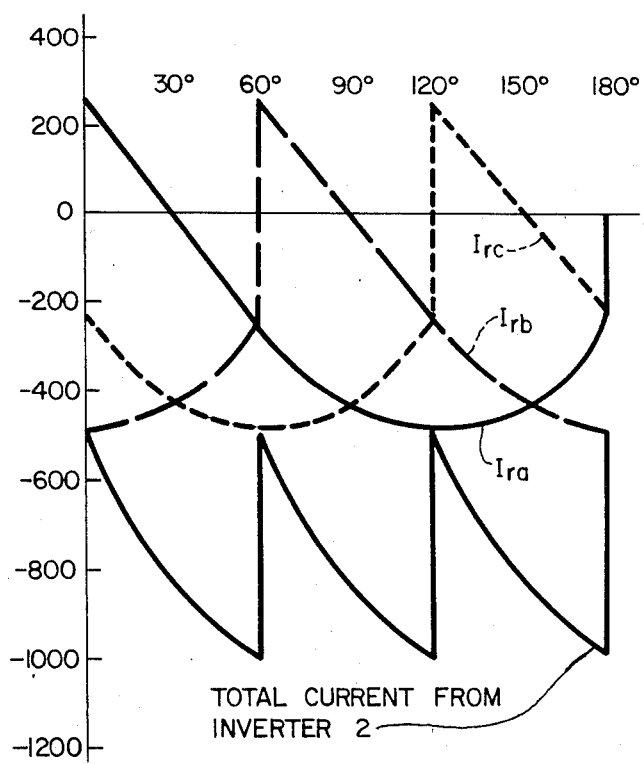

FIG. 13d illustrates the current through the power buses 106,108 and the current through each of the main generator field windings. As previously noted, the motor inverter 72 is controlled to cause the exciter to operate as a motor and apply negative torque to the shaft 62.

It should be noted that the inverters 70,72 need not be controlled in the above-described fashion, but may alternatively be controlled utilizing other control methods, such as pulse-width modulation techniques.

The components of the power converter 64 described previously are suitable to be packaged in small, simple integrated assemblies which can reduce the size of the rotor mounted power electronics, thereby allowing higher speed operation over previously known systems. This higher electromagnetic relative speed coupled with the counter-rotation of the permanent magnet exciter (if utilized) greatly reduces electromagnetic weight over prior systems.

Since the frequency at which the power converters operate is much less than in full conversion systems and since the power level is also greatly reduced, power transistor switching speeds can be longer than the one micro-second levels typically required in prior systems without a serious comprise on system efficiency. These longer switching times substantially reduce transistor voltage transients caused by inductive effects. This reduction in voltage transients and the lower operating frequency reduce snubber requirements, perhaps even eliminating the need for such snubber circuits.

Figure 14:
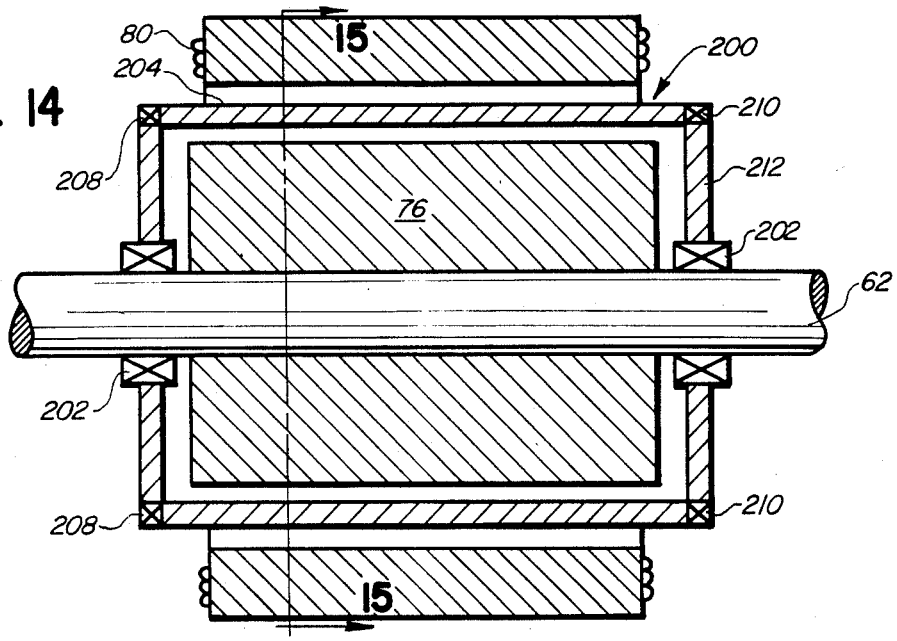
FIG. 14 is an elevational view, partly in section, of a damper cage which may be utilized in conjunction with the main generator of FIGS. 2 or 3.
Figure 15:
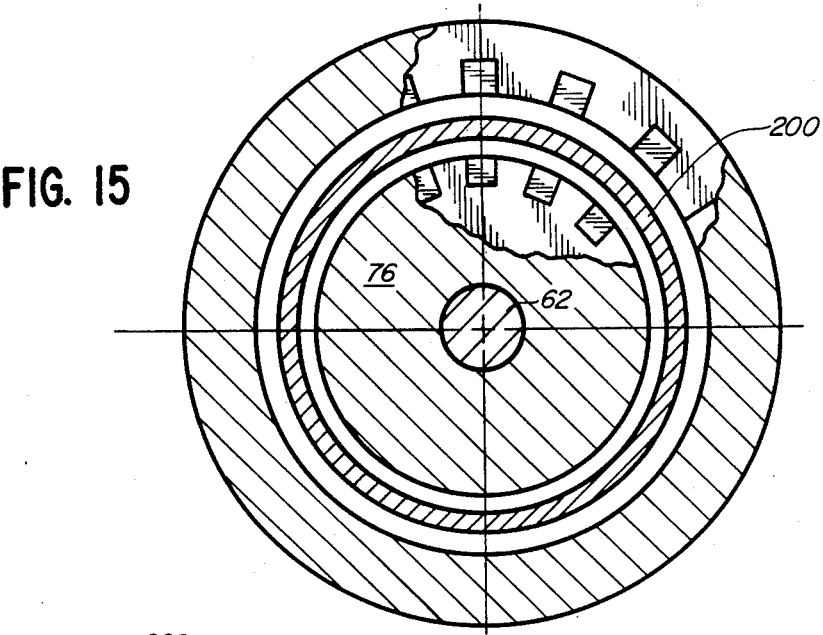
FIG. 15 is a sectional view taken along the lines 15—15 of FIG. 14.
Figure 16:
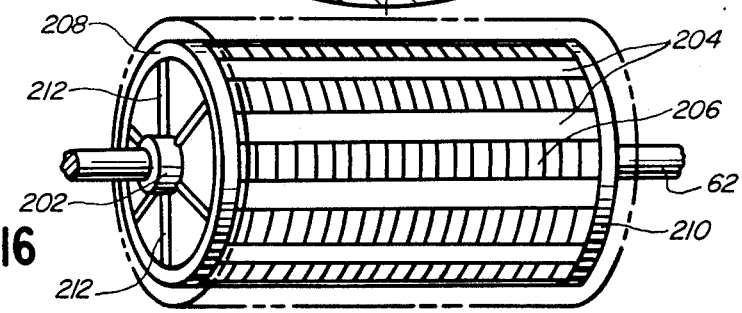
FIG. 16 is a perspective view of the damper cage shown in FIG. 14.

Referring now to FIGS. 14–16, there is illustrated an independently mounted free-running damper cage 200 disposed in the airgap of the main alternator which improves the performance of the generating systems shown in FIGS. 2 or 3.

The damper cage 200 is cylindrical in shape and is mounted on the shaft 62 by means of bearings 202 independently of the mounting of the rotor 76 on the shaft 62. As seen specifically in FIG. 16, the damper cage 200 includes a plurality of elongate axial electrically conductive copper bars 204 which are evenly spaced from one another and separated by ferromagnetic laminations 206. The copper bars 204 and laminations 206 are maintained in position by means of two electrically conductive copper end rings 208,210. The end rings are in turn mounted on the bearings 202 by means of spokes 212.

The damper cage 200 is driven at a rotational speed close to the rotational speed of the flux in the airgap of the generator 78. The damper cage acts as a short circuit to magnetic fields rotating relative thereto, in turn increasing the time constant of the alternator. This causes voltage transients to be uniform over the speed range of the system and similar in magnitude to those of a synchronous machine. This effect is due to the close magnetic coupling of the damper with the stator as in a synchronous machine. The damper cage also filters out slot ripple effects between the main rotor and stator, supports unbalanced load and fault operation and minimizes ripple currents in the rotating power converter semi-conductors.

While the damper causes approximately a 20% increase in rated load excitation due to the added airgap, it is felt that the above-noted advantages far outweigh this disadvantage in operation.

I claim:

1. In a generating system for generating output power at a desired frequency, the system having an exciter and a main generator both with rotors connected by a shaft which is driven by a variable-speed source of motive power, the exciter rotor having an armature winding which develops alternating current power at a frequency dependent upon the speed of the shaft, the main generator rotor having a field winding which develops a magnetic field in space occupied by a main generator armature winding which develops the output power in response to current through the field winding, a circuit connecting the exciter armature and main generator field windings, comprising:
   a rectifier connected to the exciter armature winding for rectifying the power developed thereby to derive DC power;
   an inverter connecter between the rectifier and the main generator field winding; and
   means coupled to the inverter and responsive to the frequency of the exciter alternative current power for controlling the inverter to convert the DC power into current for the main generator field winding to establish a magnetic field which rotates relative to the main generator armature windings at a rate which maintains the output power at the desired frequency.

2. The circuit of claim 1, wherein the controlling means includes first means for developing a signal representative of the frequency of the exciter alternating current power and second means for developing a frequency error signal representative of the magnitude of the difference between the frequency of the exciter alternating current power and a referance frequency.

3. The circuit of claim 2, wherein the controlling means further includes a ring counter coupled between the second developing means and the inverter for developing inverter control signals based upon the frequency error signal.

4. The circuit of claim 3, wherein the ring counter is capable of counting in up or down directions and wherein the controlling means further includes means coupled between the first developing means and the counter for determining whether the shaft speed is above a predetermined speed, the ring counter being responsive to the determining means to count in one of the up or down directions depending upon whether the shaft speed is above the predetermined speed.

5. The circuit of claim 1, further including a second rectifier connected to the main generator field windings, a second inverter between the second rectifier and the exciter armature windings and means for controlling the second inverter when the shaft speed exceeds a certain speed to transfer power from the main generator to the exciter.

6. The circuit of claim 5, further including a permanent magnet generator for generating auxiliary AC power and wherein second inverter controlling means includes means coupled to the permanent magnet generator for clipping the auxiliary AC power to derive inverter control signals for the second inverter.

7. The circuit of claim 1, wherein the exciter further includes a permanent magnet structure for establishing an exciter magnetic field in the space occupied by the exciter armature windings.

8. The circuit of claim 7, wherein the exciter further includes means for rotating the permanent magnet structure relative to the exciter armature winding at a speed greater than the shaft speed.

9. The circuit of claim 8, wherein the permanent magnet structure is disposed in an exciter housing and wherein the rotating means includes a sprocket disposed on the shaft, a ring gear on the housing and a spur gear transferring motive power from the shaft and sprocket to the ring gear and housing.

10. The circuit of claim 8, wherein the main generator includes polyphase armature windings and a free-running damper cage mounted on the shaft independently of the main generator rotor for minimizing output power variations when an unbalanced load is connected to the main generator armature windings.

11. In a generating system for generating output power at a desired frequency, the system having an exciter and a main generator both with rotors connected by a shaft which is driven by a variable-speed source of motive power, the exciter rotor having an armature winding which develops alternating current power at a frequency dependent upon the speed on the shaft, the main generator rotor having a field winding which develops a magnetic field in space occupied by a main generator armature winding which develops the output power in response to current through the field winding, a circuit connecting the exciter armature and main generator field windings, comprising:
    a first rectifier connected to the exciter armature winding;
    a field inverter connected between the first rectifier and the main generator field winding;
    a second rectifier connected to the main generator field winding;
    a motor inverter connected between the second rectifier and the exciter armature winding; and
    a voltage/frequency control for operating the inverters as a function of shaft speed so that a magnetic field is established in space occupied by the main generator armature winding which rotates at a fixed rate relative to the main generator armature winding substantially irrespective of shaft speed.

12. The circuit of claim 11, wherein the voltage/frequency control includes means for determining whether the shaft speed is above a certain speed and means coupled to the inverters for controlling same to deliver AC current to the main generator field winding so that the magnetic field rotates in the same direction as the rotation of the shaft when the shaft speed is less than the certain speed.

13. The circuit of claim 12, wherein the controlling means includes means for coupling a DC current to the main generator field winding so that the magnetic field does not rotate relative to the rotation of the shaft when the shaft speed is equal to the certain speed.

14. The circuit of claim 11, wherein the voltage/frequency control includes means for determining whether the shaft speed is above a certain speed and means coupled to the inverters for controlling same to deliver AC current to the main generator field windings so that the magnetic field rotates in the opposite direction relative to the direction of rotation of the shaft when the shaft speed is greater than the certain speed.

15. The circuit of claim 11, wherein the voltage/frequency control includes means for developing a voltage representing the difference between the shaft speed and a certain speed, a voltage to frequency converter for converting the difference voltage into a frequency signal having a frequency proportional to the difference between the shaft speed and the desired speed and a counter coupled to the voltage to frequency converter for developing operating signals for the field inverter based upon the frequency signal.

16. The circuit of claim 15, wherein the counter is operable to count in up or down directions and wherein the voltage/frequency control includes means coupled to the counter for determining whether the shaft speed is greater than the certain speed, the direction of counting of the counter being dependent upon such determination.

17. The circuit of claim 11, wherein the exciter includes a permanent magnet structure for establishing an exciter magnetic field in space occupied by the exciter armature windings, and wherein the voltage/frequency control includes means for controlling the motor inverter to in turn control the output voltage at a desired value.

18. The circuit of claim 17, further including a permanent magnet exciter (PMG) for generating a timing signal and wherein the motor inverter control means includes a clipper coupled to the PMG for clipping the timing signal to produce a square wave timing signal and means for shifting the phase of the square wave timing signal in dependence upon the output voltage.

19. The circuit of claim 18, wherein the shifting means includes means for developing a voltage error signal representative of the difference between the output voltage and the desired voltage and a saturable core transformer having a control winding which receives the voltage error signal and shifts the phase of the square wave timing signal based on the magnitude of the voltage error signal.

* * * * *